United States Patent [19]

Saur

[11] Patent Number: 5,738,276

[45] Date of Patent: Apr. 14, 1998

[54] VALVE

[75] Inventor: Roland Saur, Stuttgart, Germany

[73] Assignee: Behr-Thomson Dehnstoffregler GmbH & Co., Kornwestheim, Germany

[21] Appl. No.: 620,656

[22] Filed: Mar. 22, 1996

[30] Foreign Application Priority Data

Mar. 31, 1995 [DE] Germany .......................... 195 12 046.9
Dec. 7, 1995 [EP] European Pat. Off. ............. 95119289

[51] Int. Cl.$^6$ .................................................. G05D 27/00
[52] U.S. Cl. ...................... 236/92 C; 236/93 A; 251/313
[58] Field of Search ........................... 236/34, 34.5, 100, 236/93 A, 99 J, 99 K, 92 C; 251/305, 313, 337

[56] References Cited

U.S. PATENT DOCUMENTS

| | | |
|---|---|---|
| 1,112,135 | 9/1914 | Harkom et al. . |
| 1,852,918 | 4/1932 | Chandler .................................. 251/305 |
| 2,255,543 | 9/1941 | Fisher ...................................... 251/305 |
| 2,454,141 | 11/1948 | Drapeau ................................. 236/34.5 |
| 2,569,359 | 9/1951 | Vellinga . |
| 2,769,597 | 11/1956 | Mayo ........................................ 236/34 |
| 2,815,174 | 12/1957 | Rimsha .................................... 236/34 |
| 3,166,294 | 1/1965 | Middler . |
| 3,529,770 | 9/1970 | Moody ................................... 236/100 |
| 3,893,618 | 7/1975 | Wong et al. . |
| 3,990,471 | 11/1976 | Schutzer et al. ........................ 251/337 |
| 4,027,695 | 6/1977 | Schnatmeyer et al. ................ 251/337 |
| 4,283,006 | 8/1981 | Fedewitz . |
| 4,358,086 | 11/1982 | Hiltebrand . |
| 4,380,246 | 4/1983 | Casale et al. . |
| 4,399,940 | 8/1983 | Stiles . |
| 4,978,060 | 12/1990 | Stahly .................................... 236/92 C |
| 5,186,385 | 2/1993 | Karabin et al. . |
| 5,460,011 | 10/1995 | Martin ..................................... 62/187 |

FOREIGN PATENT DOCUMENTS

| | | |
|---|---|---|
| 609613 | 8/1994 | European Pat. Off. . |
| 2426084 | 1/1975 | Germany . |
| 3838547A1 | 5/1990 | Germany . |
| 1541452 | 2/1990 | U.S.S.R. . |
| 357735 | 10/1931 | United Kingdom . |

OTHER PUBLICATIONS

German Srch Rep., Dec. 8, 1995, DEX.
Patent Abstracts of Japan, 62-63285(A), Published Mar. 19, 1987, M-618 Aug. 21, 1987, vol. 11/No. 258, On-Off Device for Regulating Air Current.

Primary Examiner—William E. Tapolcai
Attorney, Agent, or Firm—Evenson McKeown Edwards & Lenahan, PLLC

[57] ABSTRACT

In the case of a valve having a closing member and having a switching element which moves the closing member into the opening direction when a given temperature is reached, it is provided that the closing member can be moved in the opening direction against the effect of a spring which is independent of the function of the switching element and therefore serves as a relief valve which can be adjusted to a desired excess pressure.

14 Claims, 2 Drawing Sheets

VALVE

BACKGROUND AND SUMMARY OF THE INVENTION

This invention relates of a valve having a closing member and having a switching member which moves the closing member in the opening direction when a given temperature is reached.

Such valves may he constructed, for example, as thermostatic valves. In the case of these thermostatic valves, a valve disk is fixedly connected with the working piston or the housing of a thermostatic working element which moves out when a temperature is reached which can be preselected by the expansion material of the thermostatic working element and opens the valve. A restoring spring is assigned to the valve disk or to the element of the thermostatic working element which is connected with the valve disk, which restoring spring must be designed for a relatively high restoring force so that, when the temperature falls, the valve disk can in fact be returned to its closing position.

A valve of the initially mentioned type is also known (U.S. Pat. No. 2,569,359) in the case of which the closing member is a flap which, by way of an intermediate lever, is connected with a working piston of a thermostatic working element which is used as a switching element. In the case of this construction, the working piston is loaded by a restoring spring.

It is an object of the invention to construct a valve of the initially mentioned type such that it not only responds to a temperature but, in addition, acts as a relief valve which responds to a selectable excess pressure.

This object is achieved in that the closing member can be moved into the opening direction independently of the switching element against the effect of a spring which is independent of the function of the switching element.

The valve according to the invention reacts to temperature by means of the temperature-dependent switching element as well as to an excess pressure by means of the relative movement between the switching element and the closing member. Since the spring bringing the closing member into the closing position is independent of the function of the switching element, it is possible to determine the characteristic curve and the prestressing of the spring assigned to the closing member in such a manner that an opening takes place in the case of a given excess pressure. Advantageously, such a valve may, for example, be used in the cooling system of an internal-combustion engine in order to shorten the warm-up phase of the internal-combustion engine. For this purpose, it is arranged in an engine outlet in front of a coolant radiator or a thermostatic valve. It blocks the coolant flow with the exception of a low selectable quantity until the coolant temperature has reached a given value, for example, between 60° and 80° C., at which the temperature-dependent switching element will respond.

in a first embodiment, it is provided that the closing member is a valve disk which can he adjusted in the opening direction by means of a working piston of a thermostatic working element.

in another embodiment, it is provided that the closing member is a flap whose swivel shaft is arranged at a distance from the center of gravity of its surface and is applied to the switching element at a distance from its swivel shaft. Since the swivel shaft is arranged at a distance from the center of gravity of the surface of the flap, an excess pressure generates a torque which is operative in the opening direction of the flap. Since the flap can be moved independently of the switching element, it can move into the opening direction in the case of an excess pressure whose value is predetermined by the spring which is independent of the switching element even when the switching element has not responded. The flap has the advantage that a large flow cross-section is opened up very rapidly so that, for example, the function of a thermostatic valve arranged in the cooling system of the internal-combustion engine remains unaffected.

As a further embodiment of the invention, an essentially tube-shaped housing, preferably made of plastic, is provided which has a valve sealing surface and a holding device for the switching element. Thus, it is achieved that the whole valve forms a separate constructional unit. This constructional unit may be arranged, for example, inside the cooling system of an internal-combustion engine at a suitable point, for example, in the area of a flange connection which is mounted on the engine outlet of the internal-combustion engine.

other objects, advantages and novel features of the present invention will become apparent from the following detailed description of the invention when considered in conjunction with the accompanying drawings.

DETAILED DESCRIPTION OF THE DRAWINGS

Figure 1:
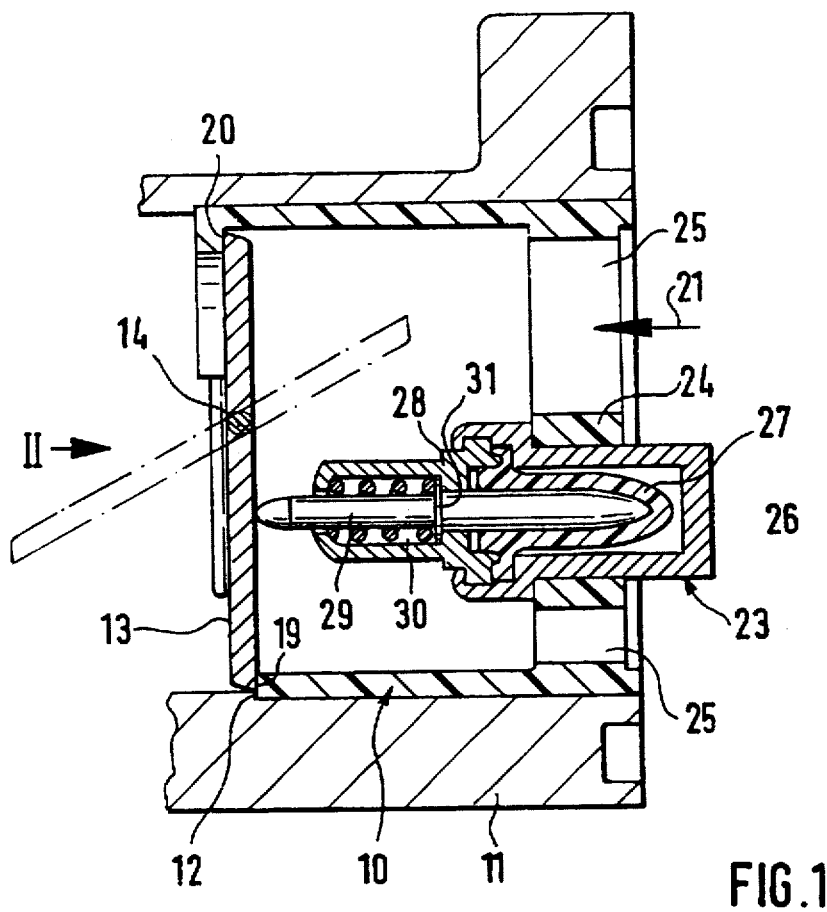
FIG. 1 is an axial sectional view of a valve constructed according to a preferred embodiment of the invention.
Figure 2:
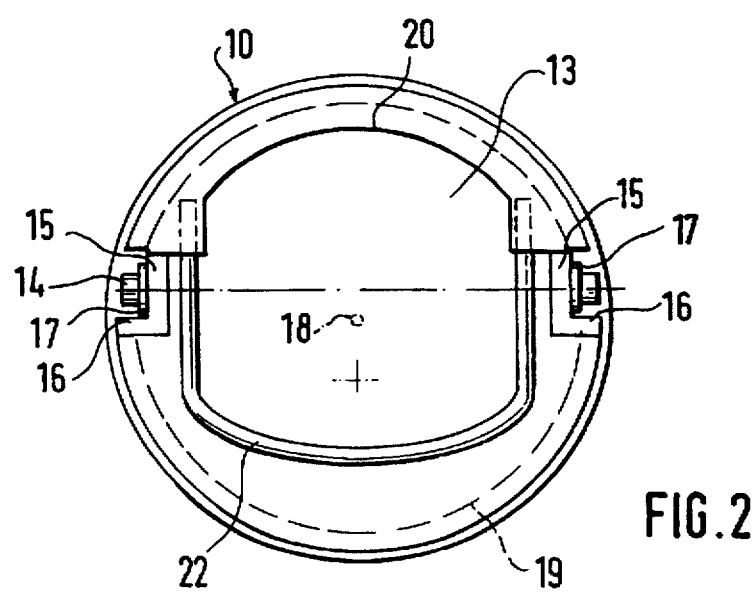
FIG. 2 is a view in the direction of the arrow II of the valve according to FIG. 1.

The valve illustrated in FIG. 1 and 2 has an essentially tube-shaped housing 10 which is fitted into a connection flange 11 and is fixed in the axial direction by means of a stop 12. The connection is preferably flanged to an engine outlet of an internal-combustion engine from which the coolant ant flowing through the internal-combustion engine leaves the engine and flows, for example, to a thermostat control valve.

In the housing 10, a flap 13 serving as a closing member is disposed by means of a swivel shaft 14. The swivel shaft 14 is disposed in bearing receiving devices 15 of the housing 10 which are situated in the area of pocket-type recesses 16. The swivel shaft 14 is a pin which is fitted through the flap 13 and the bearing receiving devices 15 and which is axially fixed by means of retaining rings 17, such as spring rings, which are fitted on the outside. This securing is sufficient because, in the installed condition, the connection 11 prevents an axial displacement of the swivel shaft 14.

The swivel shaft 14 of the flap 13 is situated at a distance from the center of gravity 18 of the surface of the flap 13 indicated in FIG. 2. An excess pressure occurring on one side of the flap 13 therefore leads to a torque with respect to the swivel shaft 14 which endeavors to swivel the flap 13.

The housing 13 is provided with valve seat surfaces 19, 20 which are assigned to the flap 13. These valve seat surfaces 19, 20 are situated at an axial distance which corresponds to the thickness of the flap 13. They are divided in the area of the swivel shaft 14 so that the sealing surfaces 19, 20 which are essentially semicircular with the exception of a recess in the area of the swivel shaft 14 are, on the one hand, assigned to the interior side and, on the other hand, to the exterior side of the flap; that is, to the interior side facing the flow direction 21 and the exterior side facing away from the flow direction. The flap 13 is loaded on its exterior side by a bow spring 22 which holds the flap 13 in the closed position illustrated in FIG. 1. The bow spring 22, which is preferably prestressed, is fitted by means of its ends into recesses of the housing 10. The above-described elements of the valve therefore form a relief valve which, in the case of an excess pressure, opens by swivelling the flap 13 open. The amount of the excess pressure causing an opening is determined by the prestressed bow spring 22.

Furthermore, the valve is constructed as a valve which switches as a function of the temperature. For this purpose, a thermostatic working element 23 is provided as a switching element which is held in a holding device 24 of the housing 10 which is constructed in one piece with the housing 10 by means of webs 25. The thermostatic working element 23 has a housing 26 in which an expansion material, particularly a wax mixture, is housed. The open end of the housing 26 is sealed off by means of a bag-shaped membrane 27 which is clamped in a sealing manner by means of a guiding insert 28. A working piston 29, which is guided by the guiding insert 28, projects into this membrane 27 and therefore into the housing 26. The working piston 29 is applied to the flap 13 at a distance from the swivel shaft 14. The thermostatic working element 23 is arranged in front of the flap 13 in the flow direction 21. The thermostatic working element 23 responds to the temperature of the medium to be blocked off, particularly a coolant of a cooling system of an internal-combustion engine. The response temperature or opening temperature of the thermostatic working element 23 at which the working piston 29 starts its movement out of the housing 26 can be adjusted by the selection of the expansion material—the composition of the wax mixture—. In the case of a cooling system of an internal-combustion engine, this opening temperature is adjusted to a range of from 60° to 80° C. The moving-out working piston 29 takes along the flap 13 and thereby opens the valve as a function of the temperature. The use of a flap as the closing element has the advantage that, even in the case of relatively small swivel movements of the flap, a relatively large flow cross-section is opened up. Since no firm connection exists between the working piston 29 and the flap 13, in the case of excess temperatures, that is, temperatures which far exceed its opening temperature, the working piston 29 can move out unhindered.

Since, by means of this type of a flap valve, particularly in the area of the bearings 15, no absolute tightness can be achieved, a certain leakage flow quantity will occur. This leakage flow quantity provides that a certain flow always exists in the flow direction 21 so that heated medium reaches the area of the thermostatic working element 23 at the higher temperature. In order to ensure a sufficient flow quantity even when the flap 13 is closed, additional bypass openings may be provided in the area of the flap 13.

Particularly when the function as the excess valve is to be designed for relatively high opening pressures, it may be sufficient to design the bow spring 22 such that it also serves as a restoring spring for the thermostatic working element 23; that is, when the temperature falls below the opening temperature, it presses the working piston 29 back into this starting position into the housing 26. However, in order to have no limitations with respect to designing the excess opening pressure and designing the restoring of the working piston 29, in the case of the embodiment according to FIG. 1, it is provided that a separate restoring spring 30 is assigned to the working piston 29. This restoring spring 30 is supported between a lengthening of the guiding insert 28 and a spring plate 31 mounted on the working piston 29.

In a modified embodiment, a tension spring is provided instead of a bow spring 22 and is mounted between one of the webs 25 and the flap 13.

Figure 3:
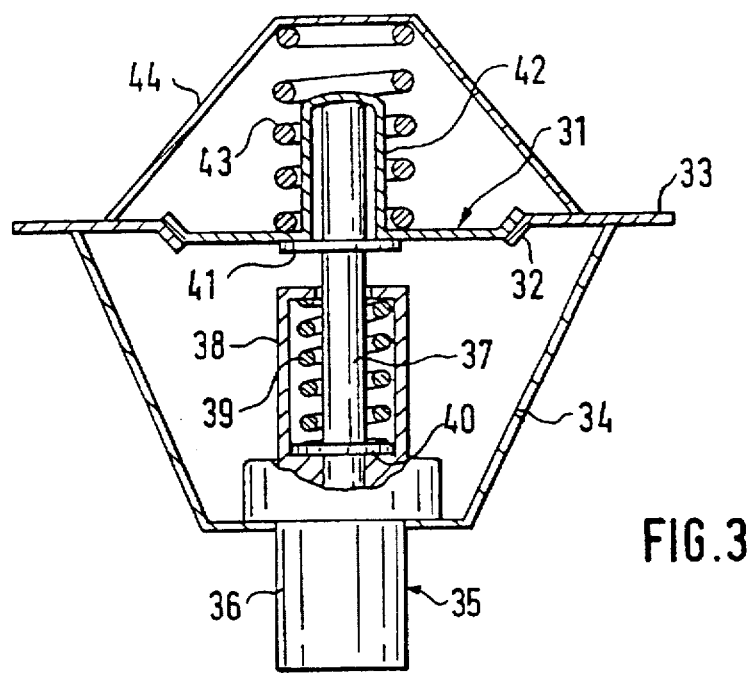
FIG. 3 is an axial sectional view of a valve constructed according to another embodiment of the invention having a valve disk.

In the embodiment according to FIG. 3, a valve disk 31, to which a valve seat 32 is assigned which is shaded onto a sheet metal ring 33, is used as the closing member. The sheet metal ring 33 forms a surrounding flange by means of which the whole valve can be clamped between an engine outlet and a connection piece. A sheet metal bow 34 is mounted on the sheet metal ring 33 and forms a holder for a thermostatic working element 35 whose construction corresponds to the thermostatic working element 23 according to FIG. 1.

The thermostatic working element 35 has a housing 36 in which an expansion material, particularly a wax mixture, is housed which, at a temperature which can be predetermined by the selection of the wax mixture, drives out the working piston 37 in a linear movement. The working piston 37 is guided in a guiding part 38 which closes off the housing 36 and forms an abutment for a restoring spring 39. The restoring spring 39 is supported on a spring plate 40 fastened to the working piston 37 and presses it into the housing 36, that is, into its closing position.

The one-piece or multi-piece working piston 37 is lengthened beyond the guide part 38 and is provided with a driving disk 41 for the valve disk 31. The valve disk 31 is provided with a cap-type pressed-out area 42 by means of which it is movably guided on the working piston 37. Furthermore, the valve disk 31 is loaded by a coil spring 43 in the closing direction which coil spring 43 is supported on a bow 44 fastened to the sheet metal ring 33.

The restoring spring 39 is designed such that, in the case of a cooling or of the response temperature, it presses the working piston 37 securely into the housing 36. For this purpose, a relatively high force is required which may be in the order of 10N. In contrast, the spring 43, which is independent of the function of the switching element, that is, of the thermostatic working element 35, is designed such that, as a result of an excess pressure of a specific amount occurring on the side of the valve disk 31 facing away from it, it is compressed by means of the force acting upon the valve disk 31 so that the valve operates as a relief valve By means of the selection of the spring stiffness 43 and of the prestressing, the amount of the excess pressure can be determined at which the valve acts as a relief valve and opens up.

In a modified embodiment, it is provided that the pressed-out area 42 or a pin mounted at its location on the valve disk 31 is guided in the bow 44 which is provided with a corresponding guiding recess. In this case, the working piston 37 can be shortened which will then be supported only against the side of the valve disk 31 facing away from the spring 43.

When the valve according to FIG. 3 is used as a so-called warm-up valve for the cooling system of an internal-combustion engine, it is expedient that a specific flow amount is admitted through the closed valve so that the warming-up coolant will reach the housing 36 of the thermostatic working element 35, operating as a sensing part, in time. In order to admit this flow quantity, breakthroughs may be provided in the sheet metal ring forming the valve seat and/or the valve disk 31, the cross-section of the breakthroughs being dimensioned such that the desired flow quantity is obtained. Such small flow quantities may also be implemented by the design of the valve disk and of the assigned valve seat 32.

In another modified embodiment similar to FIG. 3, it is provided that a flap 13 similar to the embodiment according to FIGS. 1 and 2 is disposed on the sheet metal ring 33 serving as the fastening flange. The valve surfaces of the sheet metal ring will then be designed similar to the embodiment of FIGS. 1 and 2.

Figure 4:
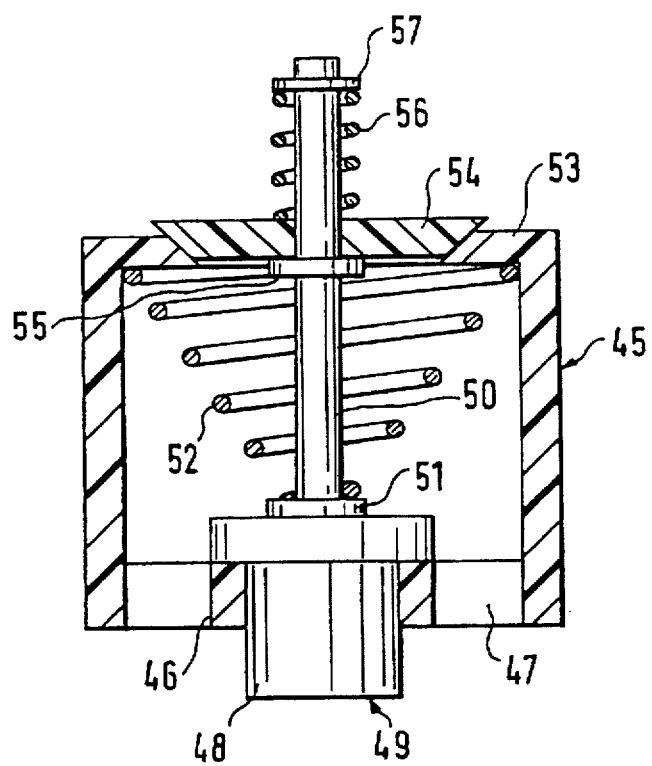
FIG. 4 is an axial sectional view of another embodiment of a valve according to the invention having a valve disk.

Corresponding to the embodiment according to FIG. 1, in the case of the valve of the embodiment according to FIG. 4, an essentially tube-shaped housing 45 is provided which is preferably manufactured of a plastic material. Corresponding to the housing 10 of the embodiment according to FIG. 1, this housing 45 can be fitted into a connection piece and can be fixed there. The housing 45 is provided with a holding device 46 which is connected, by way of several webs 47, with the exterior part of the housing 45. The holding device 46 receives the housing 48 of a thermostatic working element which is supported by means of a collar on the holding device 46 against the flow direction of the medium to be blocked. In a known manner, the housing 48 of the thermostatic working element 49 contains an expansion material which, when a certain temperature is reached, drives a working piston 50 out in a linear movement. The working piston 50 is provided with a spring plate 51 which, in the closing position of the valve, rests against the housing or a guiding part for the working piston 50 held therein. A restoring spring 52 is supported on the spring plate 51, the other end of the restoring spring 52 being supported against a collar 53 of the housing 45. The restoring spring 52 is designed such that it securely presses the working piston 50 back into the housing 48 when the temperature falls.

In addition, the collar 53 of the housing 45 forms a valve seat for a valve disk 54 which, for example, may also be made of plastic. The valve disk 53 is slidingly guided on the one-piece or multi-piece working piston 50 lengthened beyond the collar 53. The working piston 50 is provided with a driving disk 55 which takes along the valve disk 54 in the opening direction when the working piston 50 moves out.

On the side opposite the driving disk 55, the valve disk 54 is loaded by means of a coil spring 56 which is supported on a spring plate 57 fastened on the working piston 50.

By means of a suitable selection of its characteristic curve and its prestressing, the spring 46 is designed such that, at an excess pressure of a given amount, the valve disk 54 moves into the opening direction while sliding on the working piston 50.

Also in the case of this embodiment, it is provided that a flow quantity of a specific size flows through the valve also when the valve is closed. For this purpose, corresponding breakthroughs in the collar 53 and/or in the valve disk 54 or in the valve seating surfaces on both sides may be provided.

The embodiment according to FIG. 3 may also be modified such that, similar to the embodiment according to FIG. 4, the valve disk 31 is guided on the working piston 37, in which case the spring 43 is also supported on a spring plate mounted on the working piston 37. Likewise, the embodiment according to FIG. 3 may be modified such that the restoring spring 39 is designed similar to the embodiment according to FIG. 4 and is supported on the spring plate 40 and on the sheet metal ring 33.

In an embodiment modified with respect to FIG. 4, it is provided that the working piston 50 extends only to the valve disk 54. In this case, the valve disk 54 is provided with one (or several) guide pins which are then guided in guiding arms which are not shown and which project toward the inside from the lengthened housing 45 and on which the spring 56 will then also be supported.

In a modified embodiment, instead of the thermostatic working element, another temperature-dependent switching element is provided. For example, it is possible to provide a bimetallic switching element, particularly one or several bimetallic disks. Likewise, it is possible to provide a spring which consists of a so-called shape memory alloy. Such a spring will then also have the function of a switching element which switches as a function of a given temperature.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A valve assembly comprising:

a movable closing member disposed to control a fluid flow opening, a thermostatic working element operably engaged with the closing member to control opening movements of the closing member as a function of fluid flow temperature, and an overpressure response member operably engaged with the closing member to permit opening of the closing member in response to excess fluid flow pressure acting on the closing member, said overpressure response member being operable independently of said thermostatic working element, wherein the closing member is a flap with a swivel shaft arranged at a spacing from the center of gravity of the flap and to which the thermostatic working element is applied at a spacing from the swivel shaft.

2. A valve assembly according to claim 1, wherein the housing is provided with valve seat surfaces which are assigned to edges of the flap, the valve seat surfaces being divided in an area of the swivel shaft and being assigned, on the one hand, to the interior side of the flap and, on the other hand, to the exterior side of the flap.

3. A valve assembly according to claim 1, wherein the swivel shaft is fitted through the flap and through bearings of the housing and is axially secured by means of retaining rings.

4. A valve assembly according to claim 2, wherein the swivel shaft is fitted through the flap and through bearings of the housing and is axially secured by means of retaining rings.

5. A valve assembly according to claim 1, wherein a bow spring is provided which rests on the side of the flap opposite the thermostatic working element and which is held in the housing.

6. A valve assembly according to claim 1, wherein said overpressure response member is a first spring acting against the closing member in a closing direction.

7. A valve assembly according to claim 6, wherein said thermostatic working element is provided with a restoring spring separate from the first spring.

8. A valve assembly according to claim 1, wherein the fluid flow opening is in a tube shaped housing which has valve sealing surfaces engageable with the closing member and a holding device for the thermostatic working element.

9. A valve assembly according to claim 7, wherein the fluid flow opening is in a tube shaped housing which has valve sealing surfaces engageable with the closing member and a holding device for the thermostatic working element.

10. A valve assembly according to claim 1, wherein said valve assembly is configured to be inserted into an internal combustion engine cooling system.

11. A valve assembly according to claim 8, wherein said valve assembly is configured to be inserted into an internal combustion engine cooling system.

12. A valve assembly according to claim 9, wherein said valve assembly is configured to be inserted into an internal combustion engine cooling system.

13. A valve assembly according to claim 8, wherein said housing is a plastic housing.

14. A valve assembly according to claim 9, wherein the closing member is a flap whose swivel shaft is arranged at a spacing from the center of gravity of the flap and to which the thermostatic working element is applied at a spacing from the swivel shaft.

* * * * *